June 14, 1938.   L. A. DICKERMAN   2,120,324
SMOKELESS POWDER AND METHOD OF PRODUCING
Filed Sept. 15, 1933
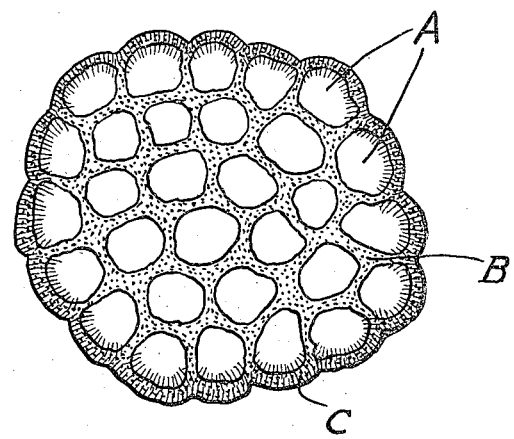
WITNESS:
INVENTOR
Louis A. Dickerman
BY
Busser & Harding
ATTORNEYS Patented June 14, 1938

2,120,324

UNITED STATES PATENT OFFICE 2,120,324

SMOKELESS POWDER AND METHOD OF PRODUCING

Louis A. Dickerman, Hackettstown, N. J., assignor to Hercules Powder Company, Wilmington, Del., a corporation of Delaware Application September 15, 1933, Serial No. 689,546

4 Claims. (Cl. 52—22)

This invention relates to an improvement in smokeless powder and method of producing. The powder in accordance with this invention will be a double base powder, and may be an ordinary nitrocellulose powder or a powder of the type including nitrocellulose in admixture with salts, a deterrent, a stabilizer, etc.

The powder in accordance with this invention will be characterized by the fact that it will comprise grains or pellets composed of colloided nitrocellulose fines; i. e. finely ground colloided nitrocellulose, alone or admixed with such other ingredients as it is desired to be included, agglomerated through the medium of a binder, the grain or pellet so formed being surface hardened as a whole with an explosive plasticizer as nitroglycerin, nitroglycol, diethylene glycol dinitrate, dinitrotoluene, trinitrotoluene, applied in a liquid state, or in solution, or emulsified in water.

The method in accordance with this invention involves the admixing of any finely ground colloided nitrocellulose with a binder in solution in a solvent, and, at the same time, with any other ingredients, if any, which it may be desired to include in the powder, partially drying the mixture to largely eliminate the binder solvent, screening to form grains or pellets and finally surface hardening the grains or pellets with an explosive plasticizer.

The powder in accordance with this invention may be produced through the use of a colloided nitrocellulose in the form of, for example, scrap powder, as scrap cannon powder. As the binder any suitable binding substance as, for example, agar agar, starch, etc., dissolved, for example, in water may be used. The powder may include any desired ingredients, as any suitable stabilizer, as, for example, diphenylamine; any desired salt as, for example, potassium nitrate, barium nitrate; any usual deterrent as, for example, dinitrotoluene, diethylphthalate, etc.

The powder grains after their formation by screening may be surface hardened through the use of any suitable explosive plasticizer as, for example, nitroglycerin, nitroglycol, diethylene glycol dinitrate, dinitrotoluene, trinitrotoluene, or the like.

In proceeding for the production of a powder in accordance with this invention a colloided nitrocellulose, as for example, scrap cannon powder, is ground in any suitable manner to produce fines desirably of a size not less than 20 mesh and preferably of a size of 100 mesh or finer. The fines are screened to remove any large particles and then thoroughly mixed with a binder, as for example, agar agar, starch, or the like, in solution in water or other equivalent solvent, and, at the same time, with such salts, a stabilizer, a deterrent, or the like, as may be desired to include in the powder. The mixing may be carried out in any ordinary mechanism used in incorporating the ingredients of smokeless powder as, for example, a Werner and Pfleiderer type mixer.

After thorough mixing the mass is broken up by screening through a screen having an opening of, for example, .102 inch, the grains or agglomerates of fines formed by the screening being then tumbled in a sweetie barrel for such a time say, for example, 30 minutes, that they will be formed into round pellets. Desirably the powder will be heated in the sweetie barrel, say to a temperature of about 50° C. to soften the binder so that hard pellets of the desired size will be formed. The grains so formed are then dried in a current of air at a temperature of say about 55° C., after which they may be graded to separate those pellets which are not of the size desired.

The grains are then hardened by a surface treatment with an explosive plasticizer, as nitroglycerin, nitroglycol, diethylene glycol dinitrate, dinitrotoluene, trinitrotoluene, or the like.

The surface hardening of the grains or pellets may, for example, be effected by admixing the grains with an explosive plasticizer, as nitroglycerin, in the form of the straight oil, in solution in any suitable solvent, or emulsified in water through the use of an emulsifying agent, as methyl cellulose, as disclosed, for example, in the application for United States Letters Patent of David R. Wiggam, Serial No. 644,690, filed November 28, 1932, and permitting the grains or pellets to dry. If desired the grains or pellets, after admixture with an explosive plasticizer, may be permitted to stand in air or water at an elevated temperature to hasten the surface hardening and finally may be tumbled, in any suitable apparatus, as a sweetie barrel, to render the grains or pellets smooth and of almost perfectly spherical form.

As illustrative of the practical adaptation of the method in accordance with this invention for the production of a powder in accordance with this invention, for example, a suitable colloided nitrocellulose, as scrap cannon powder, is ground to a fineness of say about 100 mesh. To about 240 pounds of the fines are then added 2.5 pounds of potassium nitrate, 2.5 pounds of diphenylamine, and about 125 pounds of a 4% solution of agar agar in water and the whole thoroughly mixed in a Werner and Pfleiderer mixer.

After thorough mixing the mass is broken up by screening through a screen having an opening of say for example, .102 inch. The grains formed by the screening are then tumbled in a sweetie barrel for such a time, for example, about 30 minutes, that they will be formed into round pellets. It may be necessary to heat the powder in the sweetie barrel to a temperature of say 50° C. to soften the binder so that hard pellets of a desired size will be formed. The grains so formed are then dried in a current of air at a temperature of 55° C. after which they may, if desired, be graded for uniformity. The grains are then hardened.

The grains as first formed will be composed of an agglomeration of the ground cannon powder fines and other added ingredients bound together by the agar agar.

The grains, after their formation, are hardened by thoroughly admixing with, for example, nitroglycerin in water, and tumbled in a sweetie barrel until surface hardened by the action of nitroglycerin, for example, about 100 pounds of the grained powder may be admixed with say 50 pounds of a nitroglycerin emulsion, containing say 80% of nitroglycerin emulsified in water with the use of say methyl cellulose as the emulsifier, and then stored at a temperature of 55° C. for about one week, to effect the desired hardening.

During this treatment with nitroglycerin, or other explosive plasticizer, some penetration of the interior of the grain will take place, the degree of penetration depending upon the quantity of explosive plasticizer used and the time of treatment. However, in no case will the penetration be sufficient to destroy the uncompacted character of the interior of the powder grain by causing the individual fines to coalesce to a compact mass. The nitroglycerin, or other explosive plasticizer, which penetrates the interior of the powder grain will serve, together with the agar agar or similar binder, to bind the individual fines together.

In the accompanying drawing in which a powder grain in accordance with this invention is illustrated and in which the single figure is a diagrammatic view, A indicates a plurality of colloided nitrocellulose fines, as, for example, ground scrap cannon powder; B indicates the binding material comprising the binder used in the first stage of manufacture, for example, agar agar, and some of the explosive plasticizer, for example, nitroglycerin; and C indicates a hardened surface of the grain as a whole, formed by treatment of the grain after its formation by screening with, for example, nitroglycerin.

As will be appreciated smokeless powder in accordance with this invention may be prepared on various formulae following the procedure given in the above example, and with obvious modification thereof, it being noted that from the broad standpoint the powder embodying this invention will be characterized by the fact that it will be a double base powder comprising grains composed of colloided nitrocellulose fines, with or without other ingredients, agglomerated and bound together with a binder, the grains being hardened by treatment with an explosive plasticizer; and it being noted that the method in accordance with this invention involves the admixing of such nitrocellulose fines with or without other ingredients with a binder, screening to form grains and then surface hardening the grains with an explosive plasticizer.

As will be appreciated, various ingredients of the powder, as a deterrent, may be added to the powder by dissolving such ingredient in the solvent or explosive plasticizer used to surface harden the grains, or as a surface coating after the grains are surface hardened.

The smokeless powder in accordance with this invention will be found to be hard and to be dustless and free flowing, to burn clearly, to be of low hygroscopicity, to require a lower weight of charge and to have very desirable ballistic properties.

What I claim and desire to protect by Letters Patent is:

1. A smokeless double base powder grain including colloided nitrocellulose fines agglomerated through the medium of a non-explosive binder which is a non-solvent for nitrocellulose and the grain as a whole being surface hardened with an explosive which is a plasticizer for nitrocellulose.

2. A smokeless double base powder grain including colloided nitrocellulose fines bound together by adhesive starch particles, the grain as a whole being surface hardened with an explosive which is a plasticizer for nitrocellulose.

3. A smokeless double base powder grain including colloided nitrocellulose fines bound together by adhesive particles of agar agar, the grain as a whole being surface hardened with an explosive which is a plasticizer for nitrocellulose.

4. The method of producing smokeless powder grains which includes admixing colloided nitrocellulose fines with a non-explosive binder which is a non-solvent for nitrocellulose, forming the mixture into grains, and admixing the grains with an explosive which is a plasticizer for nitrocellulose in order to surface harden the grains.

LOUIS A. DICKERMAN.